June 2, 1970  H. W. BURTON ET AL  3,515,825
STEERING WHEELS FOR ROAD VEHICLES
INCORPORATING ELECTRICAL SWITCHES Filed Dec. 11, 1968  2 Sheets-Sheet 1

INVENTOR
Harold William Burton
& Nigel Lang
BY
ATTORNEYS

June 2, 1970  H. W. BURTON ET AL  3,515,825
STEERING WHEELS FOR ROAD VEHICLES
INCORPORATING ELECTRICAL SWITCHES
Filed Dec. 11, 1968  2 Sheets-Sheet 2
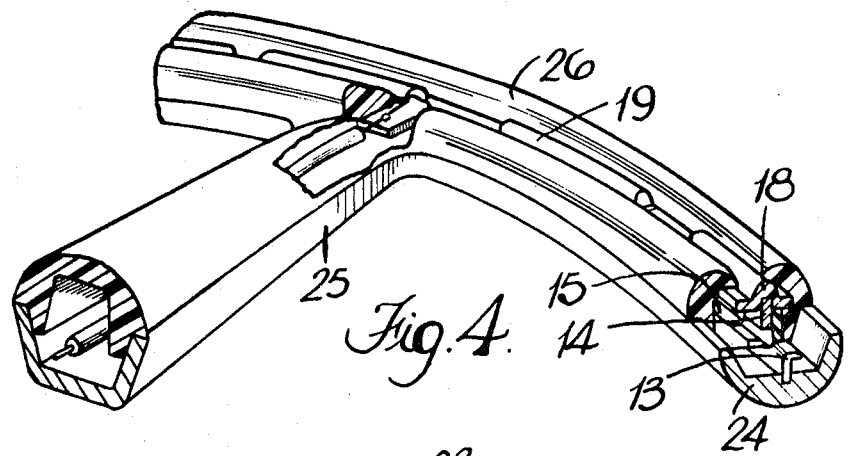
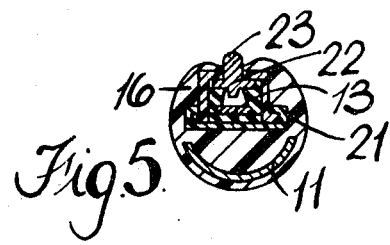
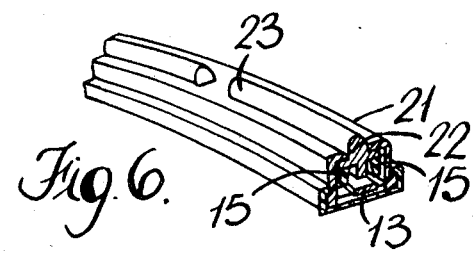
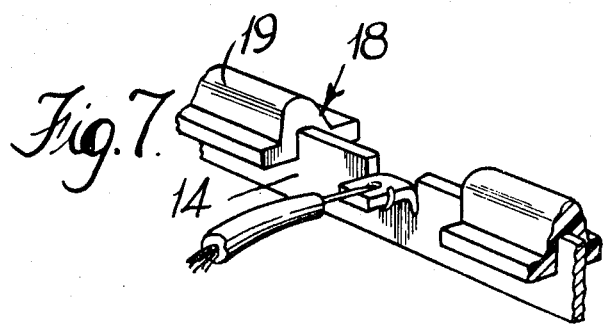
INVENTOR
Harold William Burton
& Nigel Long
BY
ATTORNEYS

United States Patent Office 3,515,825
Patented June 2, 1970

3,515,825
STEERING WHEELS FOR ROAD VEHICLES INCORPORATING ELECTRICAL SWITCHES
Harold William Burton and Nigel Long, Birmingham, England, assignors to Joseph Lucas (Industries) Limited, Birmingham, England
Filed Dec. 11, 1968, Ser. No. 783,013
Claims priority, application Great Britain, Dec. 20, 1967, 57,866/67
Int. Cl. H01h 9/00
U.S. Cl. 200—61.57                    3 Claims

ABSTRACT OF THE DISCLOSURE

A steering wheel for a road vehicle includes a rigid annular member and at least one inwardly directed radial spoke secured to the annular member. The annular member carries an annular moulding, and the annular member and the annular moulding together constitute the rim of the steering wheel. An annular contact unit is housed within the rim of the steering wheel and includes a relatively movable contact part which is resiliently urged away from a relatively fixed contact part, the movable contact part being movable into engagement with the fixed contact part to complete an electrical circuit through an auxiliary of the vehicle in use.

---

This invention relates to steering wheels for road vehicles.

A steering wheel according to the invention includes a rigid annular member, at least one inwardly directed radial spoke secured to said annular member, a conductive annular contact strip positioned to be concentric with the annular member and being of substantially the same diameter as the annular member, a conductive, annular contact ring positioned to be concentric with the contact strip and being of substantialy the same diameter as the contact strip, resilient insulating means urging the contact ring to a position spaced from the contact strip, the resilient insulating means being capable of sufficient deformation for permitting the contact ring to engage the contact strip, a one piece moulded insulating body covering the annular member and the contact ring, and extending between the contact strip and the annular member to support the contact strip in insulated relation to the annular member, means for completing an electrical circuit through an auxiliary of the vehicle including at least one terminal means for the contact ring, the one piece moulded insulating body constituting the rim of the steering wheel and having an annular region adjacent the contact ring and covering the contact ring, the annular region being sufficiently flexible for permitting manual movement of the contact ring against the action of the resilient insulating means for engaging the contact strip, and thereby complete an electrical circuit through said means for completing an electrical circuit.

Figure 1:
Figure 2:
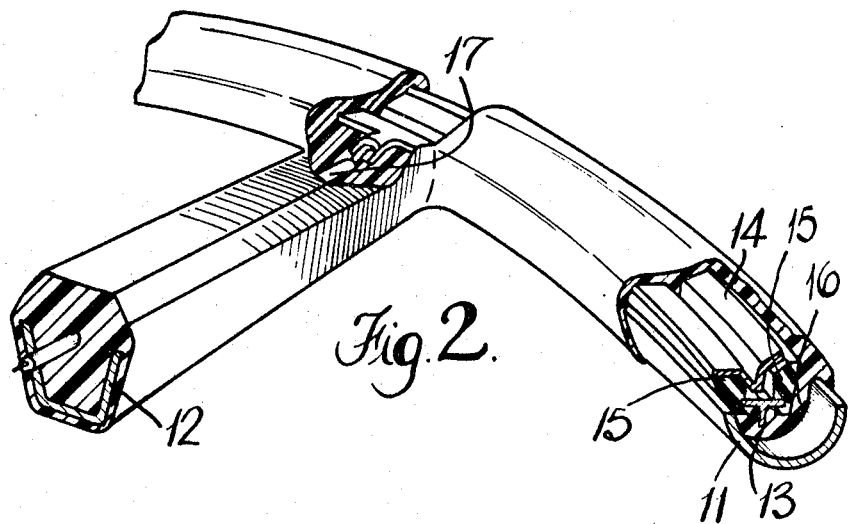
Figure 3:
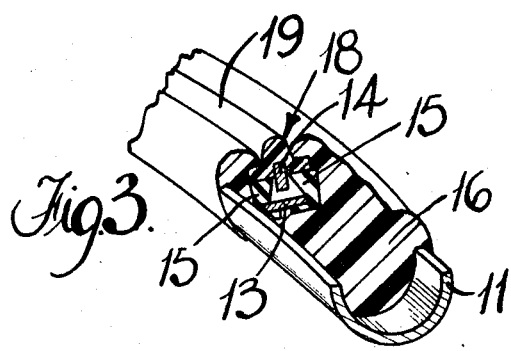

In the accompanying drawings,

FIG. 1 is a plan view of a steering wheel according to one example of the invention, FIG. 2 is a fragmentary perspective view of the steering wheel shown in FIG. 1, with parts thereof omitted for clarity, FIG. 3 is a view similar to FIG. 2 of a second example of the invention, FIG. 4 is a view similar to FIG. 2 of a third example of the invention, FIG. 5 is a sectional view of a steering wheel according to a fourth example of the invention, FIG. 6 is a fragmentary perspective view of part of the arrangement shown in FIG. 5, and, FIG. 7 is an enlarged fragmentary perspective view of part of the arrangement shown in FIG. 4.

Referring first to FIGS. 1 and 2 the steering wheel includes a rigid annular metal member 11 of semicircular cross section which has integral therewith a pair of generally diametrically opposite radially extending spokes 12, the spokes 12 being of channel shaped cross section. The spokes 12 are secured at their inner ends to a hub 12a which is mounted on the steering column of a road vehicle in use.

An annular switch comprising a relatively fixed annular conductive contact strip 13 and a relatively movable conductive contact ring 14, which is urged away from the strip 13 by a pair of annular rubber strips 15, is positioned co-axial with the member 11 in a mould and a body 16 of self-skinning foamed polyurethane is moulded around the switch and the member 11 to constitute the rim of the steering wheel.

A first lead 17 is electrically connected to the ring 14 and is led along one of the spokes 12 and a second lead (not shown) is electrically connected to the strip 13 and is led along the other spoke. The first lead 17 is connected through the horn of the vehicle to one pole of the vehicle battery, the other pole of which is grounded while the second lead is connected to ground.

The arrangement of the switch in the rim of the wheel is such that only a thin flexible skin of the moulded body covers the contact ring 14 while the contact strip 13 is separated from the member 11 by a relatively large thickness of the relatively rigid foamed polyurethane. Moreover, the strips 15 of rubber separating the ring 14 and the strip 13 are relatively soft compared with the foamed polyurethane so that by pressing the thin area of the body of polyurethane at any point around the rim of the wheel, the ring 14 can be moved into contact with the strip 13 against the resilience of the strips 15 to complete the horn circuit of the vehicle. It will be appreciated that the strips 15 of rubber prevent the foamed polyurethane entering between the strip 13 and the ring 14 during the moulding operation.

The channel sections of the spokes 12 can be filled with foamed polyurethane during the moulding of the wheel rim or can be closed by moulded detachable covers, which include integral clips with which the first and second leads are engaged in use.

The steering wheel illustrated in FIG. 3 is very similar to the steering wheel described above and parts common to both wheels are indicated with common reference numerals. The steering wheel shown in FIG. 3 differs from that shown in FIGS. 1 and 2 in that the contact ring 14 is carried in a moulded annular member 18 which includes a rib 19. The body 16 is so shaped that the rib 19 projects from the base of an annular groove in the rim of the wheel, the rib 19 being depressed into the body 16 to complete the horn circuit of the vehicle.

FIGS. 5 and 6 illustrate a modification of the steering wheel shown in FIG. 3.

In FIG. 5 the contact strip 13 and the rubber strips 15 are carried in an annular moulded synthetic resin housing 21 and the molded member 18 and the contact ring 14 are replaced by an annular conductive part 22 also carried by the housing 21. The part 22 includes a plurality of spaced upwardly presented ribs 23 (FIG. 6) which extend through slots in the upper face of the housing 21. The body 16 of the steering wheel is moulded around the member 11 and the housing 21 and is shaped to allow the ribs 23 of the part 22 to project therefrom. In use, the part 22 is electrically connected in the horn circuit of the vehicle in place of the contact ring 14, and is depressed into engagement with the strip 13 to energise the horn of the vehicle.

In FIGS. 4 and 7 parts common to FIGS. 2, 3, 5 and 6 of the drawings are designated with the reference numerals which they bear in those drawings.

Referring to FIGS. 4 and 7, the steering wheel includes a relatively rigid annular member 24 moulded in Delrin and having integral therewith a pair of generally diametrically opposite radially extending spokes (one of which is shown at 25). The spokes and the member 24 are of generally semicircular cross section and secured within the channel of the member 24 is an annular fixed contact strip 13.

Secured to the member 24 and defining therewith the rim of the steering wheel is a moulded annular cover 26 including a pair of radial portions which engage the spokes of the member 24 respectively. The cover 26 is also of generally semicircular cross section and so an annular passage is defined between the member 24 and the cover 26. Mounted within said passage in the rim of the steering wheel, is an annular member 18 which is moulded in synthetic resin and which has secured thereto an annular contact ring 14. The member 18 is mounted for movement towards and away from the contact strip 13 and is urged away from the strip 13 by a pair of annular rubber strips 15. Moreover, the member 18 includes a plurality of ribs 19 which project upwardly through slots in the cover 24.

In use, the strip 13 and the ring 14 are connected in the horn circuit of the vehicle in the manner previously described so that depression of the member 18 against the resilience of the strips 15 moves the ring 14 into engagement with the strip 13 to complete the horn circuit of the vehicle. The cover 26 can be moulded in the synthetic resin material known as A.B.S.

In a modification of the steering wheel described with reference to FIGS. 4 and 7 of the drawings, the cover 26 is moulded in rubber and the strips 15 are formed integrally with the cover 26.

Having thus described our invention what we claim as new and desire to secure by Letters Patent is:

1. A steering wheel for a road vehicle comprising a rigid annular member, at least one spoke secured to the annular member and extending radially inwardly from the annular member, a conductive annular contact strip positioned so as to be concentric with the annular member and being of substantially the same diameter as the annular member, a conductive, annular contact ring positioned so as to be concentric with the contact strip and being of substantially the same diameter as the contact strip, resilient insulating means urging said contact ring to a position spaced from said contact strip, said resilient insulating means being capable of sufficient deformation to permit said contact ring to engage said contact strip, a one piece moulded insulating body covering said annular member and said contact ring, and extending between said contact strip and said annular member so as to support said contact strip in insulated relation to said annular member, means for completing an electrical circuit through an auxiliary of the vehicle including at least terminal means for said contact ring said one piece moulded insulating body constituting the rim of the steering wheel and having an annular region adjacent the contact ring and covering the contact ring, said annular region being sufficiently flexible to permit manual movement of the contact ring against the action of said resilient insulating means to engage the contact strip, and thereby complete said electrical circuit.

2. A steering wheel as claimed in claim 1 wherein said resilient insulating means is constituted by at least one strip of resilient insulating material acting between said contact strip and said contact ring to urge said contact ring away from said contact strip.

3. A steering wheel as claimed in claim 1 wherein said rigid annular member is moulded in synthetic resin material.

References Cited

UNITED STATES PATENTS

| | | | |
|---|---|---|---|
| 2,025,979 | 12/1935 | Getty | 200—61.57 |
| 1,318,478 | 10/1919 | Buckles | 200—61.57 |
| 2,943,164 | 6/1960 | Kniffin | 200—61.57 |

ROBERT K. SCHAEFER, Primary Examiner

M. GINSBURG, Assistant Examiner